Patented Nov. 17, 1953

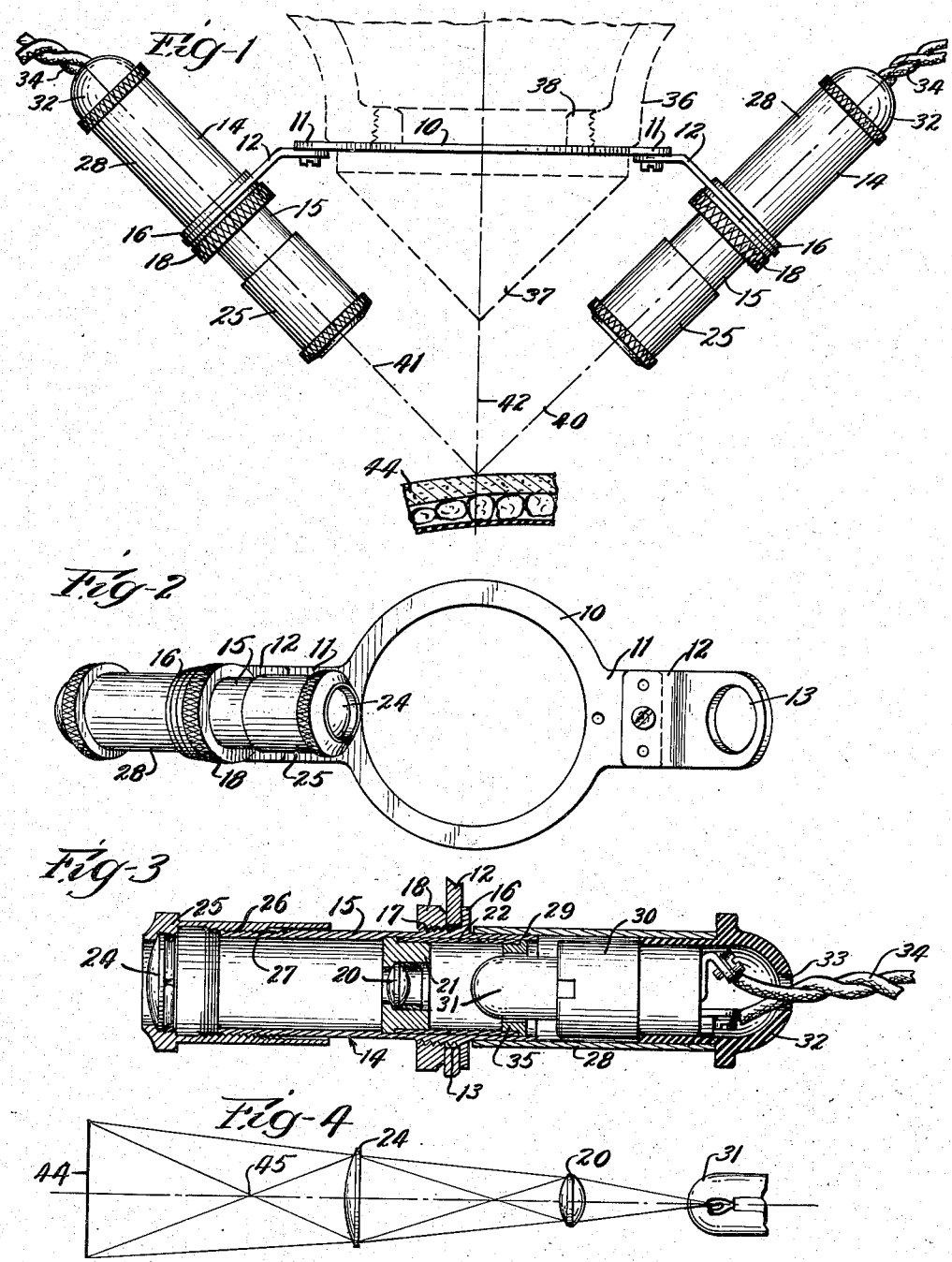

2,659,824

UNITED STATES PATENT OFFICE 2,659,824

POSITION INDICATING MEANS FOR X-RAY PROJECTORS

Edwin Burnham, Glenview, Ill., assignor to Robert C. Brown, Jr., Highland Park, Ill., as trustee Application January 12, 1949, Serial No. 70,524

2 Claims. (Cl. 250—64)

Dental X-ray specialists and other qualified persons know that a large percentage of denture X-rays are not satisfactory for two reasons:

1. The X-ray beam was not directed squarely at the object to be photographed and the film.
2. The projector was not at the correct distance from the object—the distance for which the projector is designed, and which is critical for proper intensity of exposure.

Heretofore, the projector has been pointed toward the target somewhat after the fashion of pointing a gun, but the shape of the machine does not lend itself to accurate pointing, and the distance from the target has been "read by eye" or measured awkwardly.

A similar situation obtains in the use of X-rays in industry to photograph machinery, castings, etc.

The principal object of this invention is to provide means by which the relative position of the X-ray projector and the target will be indicated by a pattern of light on the object, the form of which is determined and varied by the direction of X-ray beam and the distance to the target.

Generally speaking, this is accomplished by providing the X-ray projector which, as customary, has a universal mount with beams of light having their axes in the plane with and intersecting in the mid portion of the X-ray beam. By that means, the correct position will be indicated by a single, symmetrical spot of light on the target formed by the coincident action of the intersecting beams of light. Any and every variation from that symmetrical spot will indicate incorrect position. Since the beams strike the target continuously, and hence the indication of position is continuous, the projector can be moved into the correct position easily and quickly.

In this preferred embodiment of the invention, shown in the drawings—

Fig. 1 is a plan view of a device embodying the invention attached to the snout of a familiar form of X-ray projector;

Fig. 2 is a front view of the device with one light projector removed;

Fig. 3 is a section on the line 3—3 of Fig. 1; and

Fig. 4 is a diagram indicating, generally, the means for directing a beam of light onto the target.

This embodiment includes a base or support 10, shown as a flat metallic ring adapted to surround the X-ray beam having oppositely disposed arms 11 provided with portions 12 inclined at equal angles to the general plane of the ring 10 and having openings 13 to receive projectors, generally indicated at 14.

Each light projector 14 includes a barrel 15 having a collar 16 and a threaded portion 17 adapted to receive a nut 18 by which the light projector is clamped to the corresponding arm 12.

Within the barrel 15 is a condensing lens 20 mounted in a thimble 21, which is, in turn, mounted in a sleeve 22, telescoped within the barrel 15.

Another lens 24 is suitably mounted in a tube 25, internally threaded at 26, telescoped over and threaded to the barrel 15 at 27, whereby the lens 24 may be moved in and out to adjust the focal point.

A lamp sleeve 28 is telescoped over the outer end portion 29 of the barrel 15, and is equipped with a lamp socket 30 for a lamp 31 and an insulating thimble 32 having an opening 33 for the light wires 34. The lamp 31 is centered by a collar 35, telescoped within the lens sleeve 22 and the outer end 29 of the barrel 15.

The device, here shown, is an attachment to be applied to a well known X-ray projector including a casing 36, which is provided with a conical snout 37 having a reduced threaded portion 38 by which it is secured to the casing 36. In applying the attachment, this snout is removed and the reduced portion inserted through the ring 10 and replaced within the casing 36.

In this relation, the axes 40 and 41 of the two light projectors 14 lie in the same plane as the center line, or what may be called the axis, 42 of the X-ray beam projected from the machine. By this arrangement, the beam of light from each light projector 14 will intersect the beam of light from the other light projector and the mid portion of the X-ray beam coincidentally.

Assuming that the ring 10 of the attachment is in the plane at right angles to the X-ray beam and the target 44 is parallel to the ring, the two light beams will form a single symmetrical spot of light on the target centered with respect to the X-ray beam. Any variation from that shape of a spot of light will indicate that the target is tilted from its proper position, or moved away from its proper place, with respect to the X-ray projector, or both, and a little moving of the projector will indicate the nature of the error and make it easy to bring the projector and the target into the correct position.

In practice, the operator will light the lamps 31 and move the projector toward the target, observing the light spots formed upon it. The shape and patterns of the light spots immediately indicate the relative position of the projector and the target, and the skilled operator will be able to quickly and easily move it to such a position that the light pattern becomes a single symmetrical spot on the target, which is the correct position for the photograph. Obviously various shapes and patterns for the light projector beams may be used, the only requirement being that the projected beams are symmetrical to their respective axes so that when the spots produced by the light beams on the subject target are caused to intersect to a given extent and are symmetrical with each other, it is established that the X-ray projector is at a given distance from the target and the axis of the X-ray is normal to the target.

Preferably, the light projectors 14 are so made as to provide for the focusing indicated in the diagram (Fig. 4), whereby the rays of light from the lamps 31 are brought through a focus 45, and then directed on the target 44, for by this arrangement the concentration can be made such as to produce a distinct, sharp spot of light on the target as the adjustment approaches a proper position for photography, and that may be with the target far or near according to the technique being used. The clearness and distinctness of the light pattern makes it easy for the operator to read the indication accurately, and thus handle the apparatus speedily and correctly.

The apparatus shown and described is a simple, practical embodiment chosen to best illustrate the principle of the invention.

I claim:

1. A position indicator for an X-ray machine of the type having a casing and a removable nose piece threadedly engaging said casing and through which the X-ray beam passes, comprising a flat ring adapted to be secured to said casing and held thereon by said nose piece, brackets fixedly secured to said ring at diametrically opposed points thereof, and a light projector fixedly mounted on each of said brackets and having its optical axis inclined to the direction of the X-ray beam issuing from said casing, whereby the rays issuing from said projectors intersect in the axis of the X-ray beam at a predetermined distance in front of said nose piece.

2. The process of accurately spacing and orienting an X-ray machine having a universal mount with respect to the subject target which consists in providing the machine with diametrically opposed light beam projectors adapted to project beams symmetrical to their respective axes, the optical axes of which beams are equally inclined to the axis of the X-ray beam and lie substantially in the same plane, whereby when the light beams from said projectors are caused to intersect to a given extent on the subject target the latter is known to be at a given distance from the X-ray machine, and when the spots produced by the light beams on the subject target are caused to intersect to such extent and are symmetrical to each other, the X-ray beam is known to be normal to the subject target.

EDWIN BURNHAM.

References Cited in the file of this patent

UNITED STATES PATENTS

| Number | Name | Date |
|---|---|---|
| 2,269,737 | Rogers | Jan. 13, 1942 |
| 2,376,836 | Tunnicliffe | May 22, 1945 |
| 2,455,928 | Hawks | Dec. 14, 1948 |
| 2,556,866 | Bucky | June 12, 1951 |

FOREIGN PATENTS

| Number | Country | Date |
|---|---|---|
| 520,432 | Great Britain | Apr. 24, 1940 |
| 597,897 | Germany | June 2, 1934 |
| 632,451 | Germany | July 8, 1936 |